United States Patent [19]
Anselmino

[11] 3,848,147
[45] Nov. 12, 1974

[54] ANGULAR VELOCITY DETECTOR
[75] Inventor: Giovanni Anselmino, Turin, Italy
[73] Assignee: Fiat Societa per Azioni, Turin, Italy
[22] Filed: Dec. 13, 1972
[21] Appl. No.: 314,640

[30] Foreign Application Priority Data
Dec. 14, 1971 Italy.................................. 071085/71

[52] U.S. Cl. .............................................. 310/168
[51] Int. Cl. ............................................ H02k 19/24
[58] Field of Search ........... 310/168, 169, 170, 155, 310/171, 75, 77, 90; 235/95 B; 324/174

[56] References Cited
UNITED STATES PATENTS

| | | | |
|---|---|---|---|
| 3,500,091 | 3/1970 | Jones | 310/90 |
| 3,551,712 | 12/1970 | Jones | 310/168 |
| 3,604,966 | 9/1971 | Liggett | 310/168 |
| 3,626,225 | 12/1971 | Pauwels | 310/168 |
| 3,626,226 | 12/1971 | Pauwels | 310/168 |
| 3,626,228 | 12/1971 | Jordan | 310/168 |
| 3,653,471 | 4/1972 | Burckhardt | 324/174 |
| 3,716,788 | 2/1973 | Nishida | 324/174 |
| 3,719,841 | 3/1973 | Ritsema | 310/155 |

*Primary Examiner*—R. Skudy
*Attorney, Agent, or Firm*—Sughrue, Rothwell, Mion, Zinn & Macpeak

[57] ABSTRACT

An arrangement for mounting an angular velocity detector on a vehicle wheel hub and axle assembly includes an axially directed cylindrical flange on the wheel hub which cooperates with a radially inner surface of the tone wheel which is also provided with a radially inwardly directed flange abutting the end of the flange on the wheel hub. The teeth of the tone wheel are mounted on the radially outer surface of the tone wheel and the tone wheel may be hot-keyed onto the flange on the wheel hub. The magnetic pickup is mounted on one of a pair of arcuate clamping members which surround the axle and which are secured together by means of a pair of bolts. A protective apertured cover is mounted on the magnetic pickup intermediate the pickup and the tone wheel to protect the pickup during positioning of the two elements during assembly.

2 Claims, 4 Drawing Figures

3,848,147

ANGULAR VELOCITY DETECTOR

BACKGROUND OF THE INVENTION

The present invention relates to a device for detecting the angular velocity of a wheel of a vehicle suitable for use in an anti-skid braking system.

There are a number of problems involved in mountings for such detectors, which normally comprise a tachometric generator carried by the rotating part of the wheel and an electromagnetic pick-up fitted to the framework of the vehicle.

The most important problems are the difficulty of concentrically centering the tachometric generator and the electromagnetic pick-up in order to ensure that an accurate signal is produced, and the maintenance of this concentric relationship when the rotating parts of the machine are worn, causing undesirable asymmetry, such as might occur, for instance, with worn bearings. In addition, it would be desirable to be able to mount the detector on the wheel of an existing vehicle without modifying substantially the structure of the vehicle itself. Similarly a device which permits of rapid and easy assembly and dismantling without there being a danger of an impact between the tachometric generator and pickup would be of advantage.

OBJECTS OF THE INVENTION

The object of the present invention is to provide an angular velocity detector arrangement in which the above-mentioned problems are eliminated or reduced.

SUMMARY OF THE INVENTION

According to the present invention, an angular velocity detector for a wheel of a vehicle, comprising a tachometric generator or phonic wheel, mountable on the wheel, and an electromagnetic pickup mountable on the frame of the vehicle, is characterised in that the tone wheel is formed by a toothed metal ring at least part of which is engageable over a cooperating part of the wheel hub of the vehicle, onto which it is fitted when assembled to the vehicle, the ring also having a lateral face which abuts a cooperating face of the wheel hub, when assembled, and the electromagnetic pickup having means for attaching it to a fixed part of the vehicle.

Various other features and advantages of the invention will become apparent during the course of the following description with reference to the accompanying drawings which is provided purely by way of non-restrictive example.

DESCRIPTION OF THE ILLUSTRATED EMBODIMENTS

Figure 1:
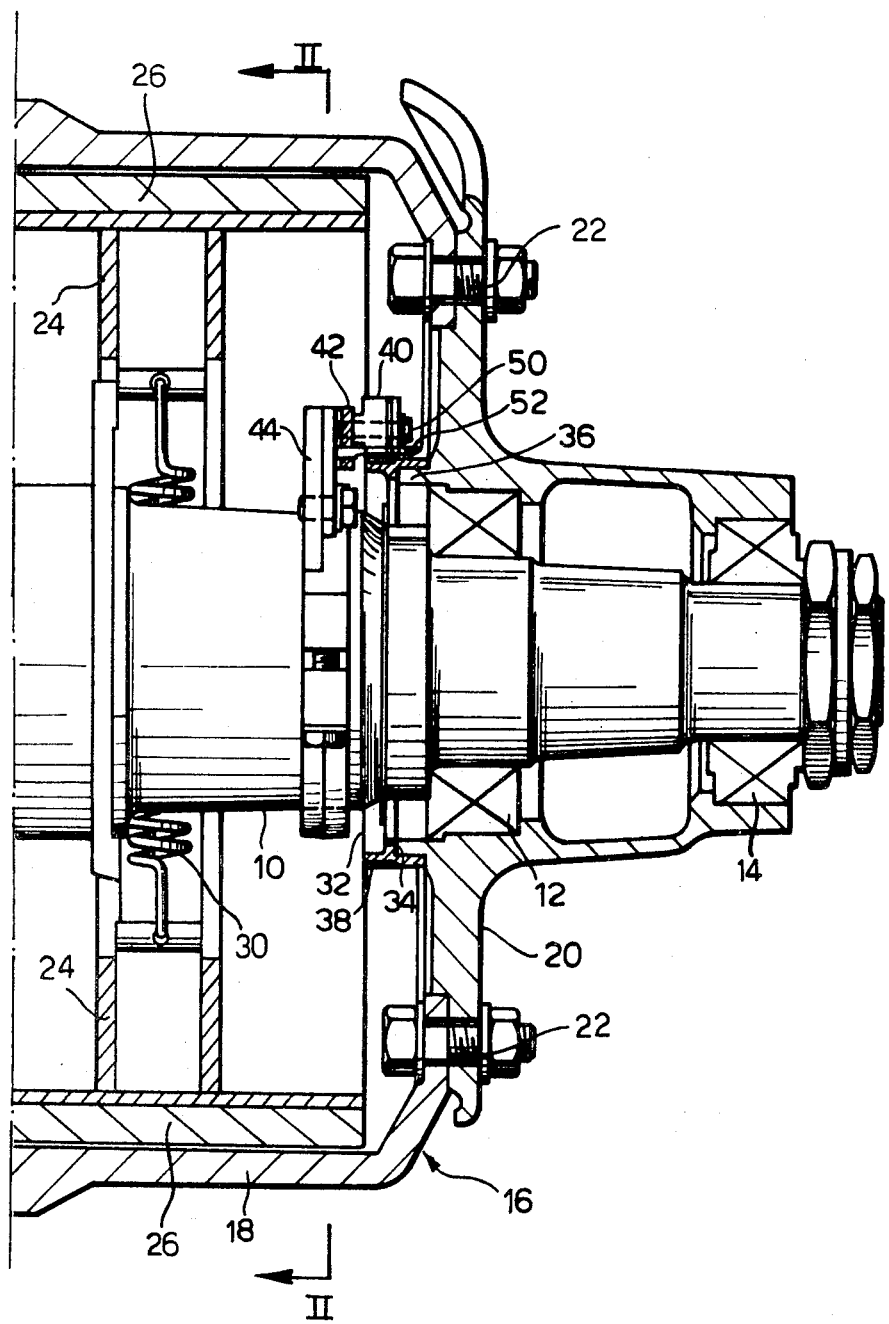
FIG. 1 is an axial section of the hub of a nonsteering wheel of a road vehicle, incorporating a first embodiment of the invention.
Figure 2:
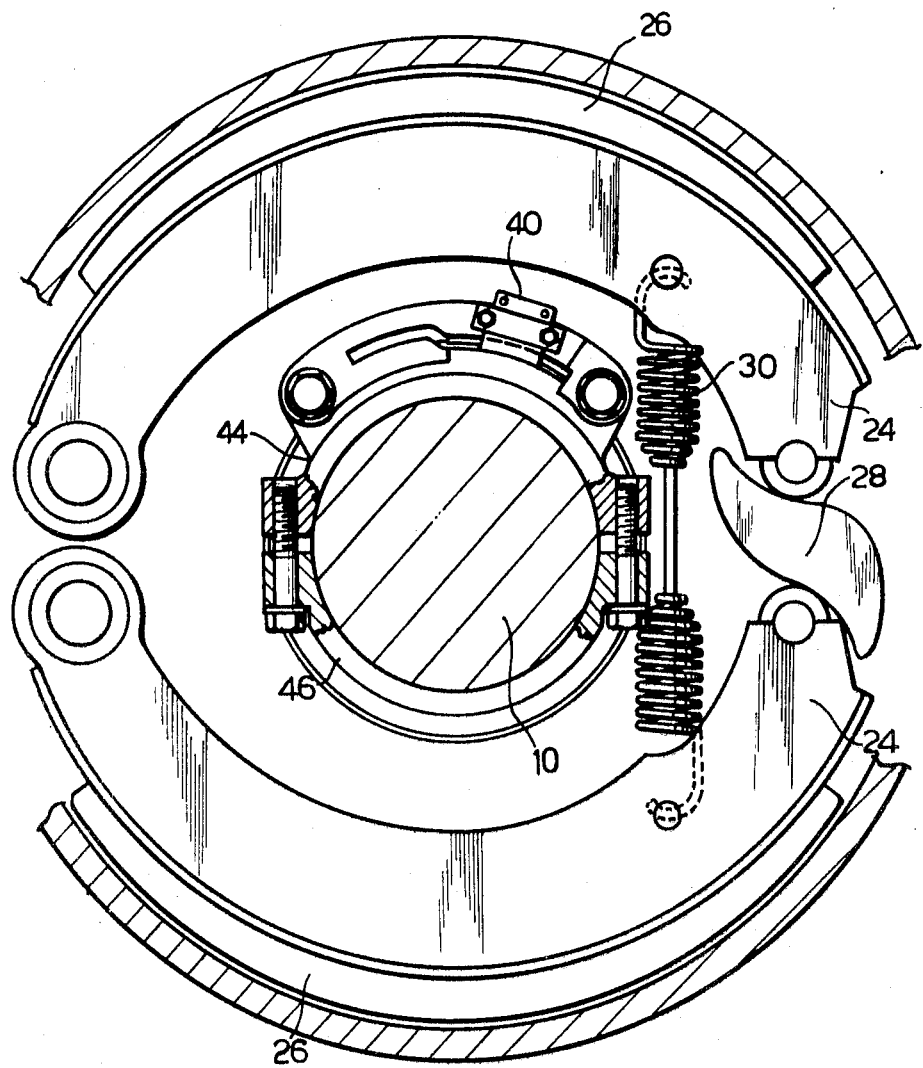
FIG. 2 is a sectional view taken along the line II—II of FIG. 1.

Referring now to FIG. 1 there is shown the axle of a motor vehicle (not shown) on which there is supported a wheel hub 20 by means of roller bearings 12, 14 such that the hub 20 may rotate about the axle 10. A brake drum 18 is connected to a support flange on the hub 20 by bolts 22, and in FIG. 2 may be seen inter alia, brake shoes 24 with respective linings 26, an operating eccentric 28 and return spring, 30.

The angular velocity detector is in the form of a tone wheel 32 and comprises a laminated metal ring having an internal annular projection 34; upon assembly the tone wheel 32 is hot-keyed for example, to one end 36 of the wheel hub 20 and the internal annular projection 34 serves to ensure that the tone wheel is exactly concentric with the wheel support; the tone wheel has outer teeth 38.

The mounting of the tone wheel 32 on the wheel hub 20 is entirely independent of the mounting of a magnetic pickup 40 which cooperates with the tone wheel; this is supported by a small plate 42 carried by a first half shell 44 which fits over the axle 10, and is secured to a second half shell 46 by means of set screws 48 which are screwed into the half shell 44. The electromagnetic pickup 40 is fixed to the plate 42 by means of a bolt 50 passing through fixing holes which are of such a shape as to permit adjustment of the position of the pickup. Thus it is possible to accurately adjust the position of the pickup in a very precise manner, to satisfy the requirements of the electronic circuit to which the pickup is connected.

A further plate 52 is attached to the plate 42 and extends perpendicularly thereto between the pickup 40 and the tone wheel 32, there being an aperture in alignment with the operative elements of the pickup; this protects the pickup from the possibility that by imperfect alignment of the support 20 during assembly the tone wheel 32 might strike against the operative elements of the pickup rendering it partially or totally inoperative. In another embodiment not shown, there is a cover extending more completely over the electromagnetic pickup.

Figure 3:
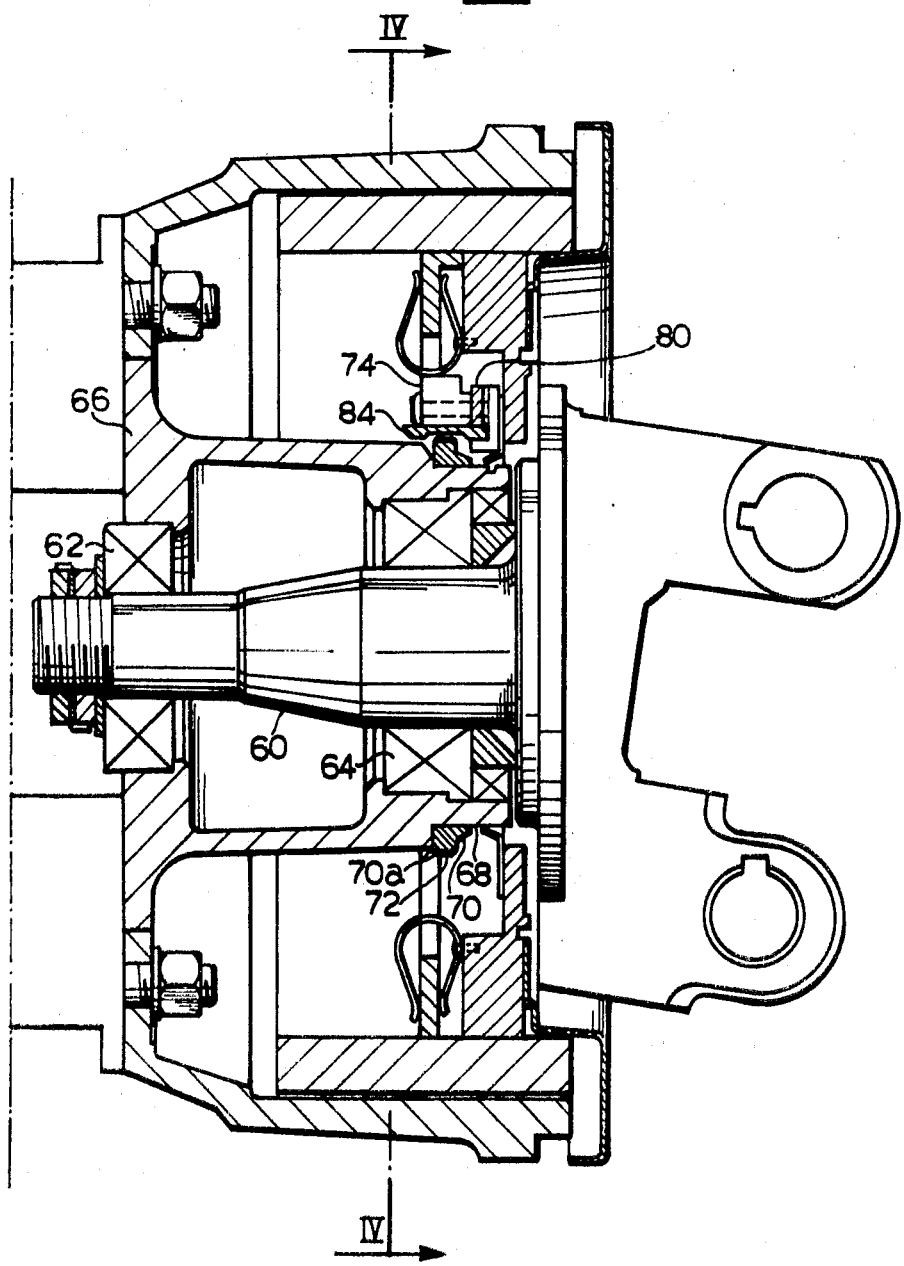
FIG. 3 is an axial section showing a second embodiment of the invention, similar to the embodiment of FIG. 1, but incorporated into the hub of a steering wheel of a road vehicle.
Figure 4:
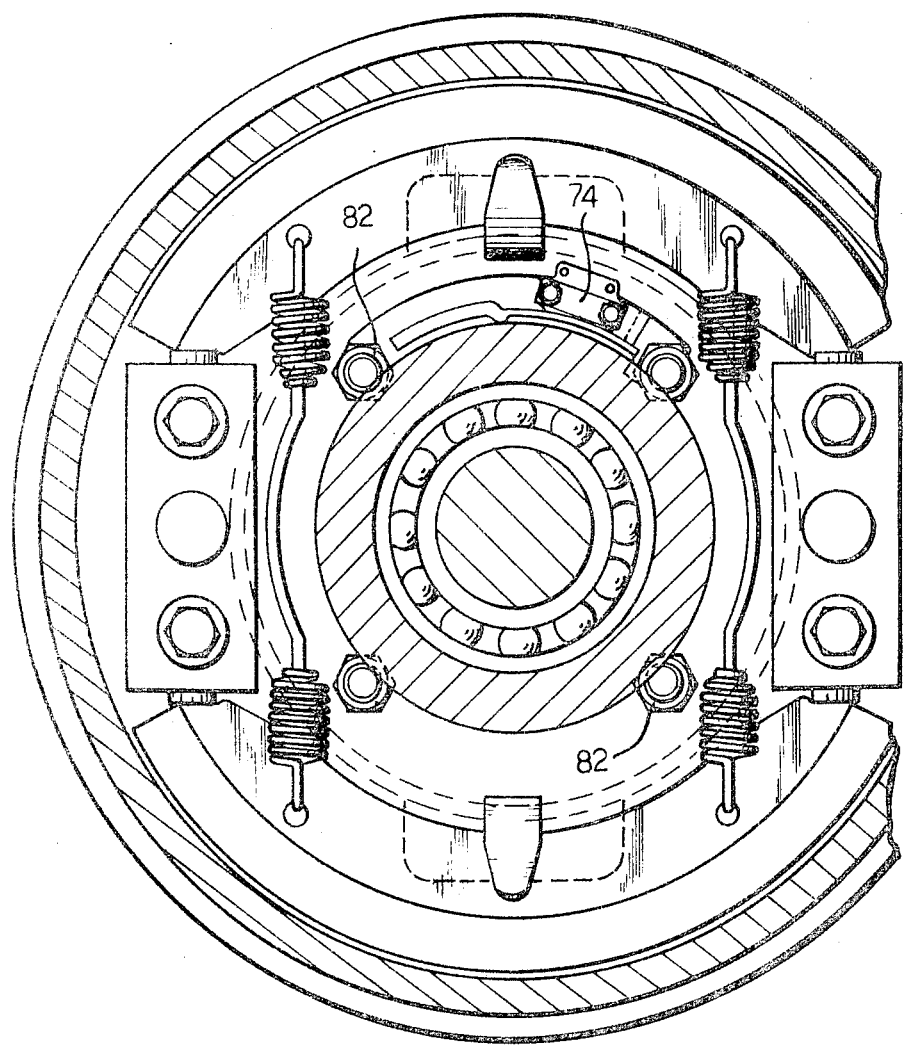
FIG. 4 is a sectional view taken along the line V—V of FIG. 3.

FIGS. 3 and 4 illustrate the same general principle of assembly of a tone wheel and electromagnetic pickup arrangement on pivoted axles of a vehicle. In FIGS. 3 and 4 there is shown a pivoted axle 60 on which there are mounted roller bearings 62 and 64 which carry a wheel hub 66. To an annular axial rim 68 of the wheel hub 66 is hot-keyed tone wheel 70 having external teeth 72 and a lateral face 70a able to abut against an annular shoulder of the wheel hub 66.

An electromagnetic pickup 74 is fitted to a first plate 80 which is bolted to a plate which carries the brake shoes by means of bolts 82. A second plate 84 projects axially from the plate 80 and has the same function as the plate 52 of the arrangement illustrated in FIGS. 1 and 2, that is to protect the pickup against accidental blows during assembly and dismantling.

I claim:

1. A vehicle wheel hub and axle assembly comprising a fixed axle, roller bearings mounted on said axle, a wheel hub supported on said bearings for rotation about the axle, and an angular velocity detector including a tone wheel mounted on said hub and an electromagnetic pickup mounted on said axle wherein said hub has an integral rim provided with a cylindrical and a lateral annular face and said tone wheel is in the form of a ring having a plurality of teeth located on the radially outer surface of the ring, a radially inner cylindrical surface seating on the cylindrical surface of the hub and a radially inwardly projecting flange having a lateral annular face abutting the lateral annular face on the rim of the wheel hub, said assembly further comprising means for fixedly attaching said electromagnetic pickup to said axle comprising first and second arcuate half-shells shaped to fit over said axle, bolting means for bolting said first and second arcuate half-shells together and means for mounting said electromagnetic pickup on one of said arcuate half-shells.

2. The assembly of claim 1 further comprising an apertured cover element which at least partially covers said electromagnetic pickup and extends between said electromagnetic pickup and said tone wheel with an aperture aligned with said pickup to protect said pickup during positioning relative to said tone wheel.

* * * * *